United States Patent [19]
Wai

[11] Patent Number: 5,225,173
[45] Date of Patent: Jul. 6, 1993

[54] METHODS AND DEVICES FOR THE SEPARATION OF RADIOACTIVE RARE EARTH METAL ISOTOPES FROM THEIR ALKALINE EARTH METAL PRECURSORS

[75] Inventor: Chien M. Wai, Moscow, Id.

[73] Assignee: Idaho Research Foundation, Inc., Moscow, Id.

[21] Appl. No.: 782,612

[22] Filed: Oct. 25, 1991

Related U.S. Application Data

[63] Continuation-in-part of Ser. No. 714,265, Jun. 12, 1991.

[51] Int. Cl.$^5$ .................. C01F 13/00; C01F 17/00
[52] U.S. Cl. ................................. 423/2; 423/21.5; 423/157; 549/349; 549/352
[58] Field of Search ............... 423/2, 21.5, 157; 549/349, 352

[56] References Cited

U.S. PATENT DOCUMENTS

| | | | |
|---|---|---|---|
| 3,562,295 | 2/1971 | Pedersen | 549/352 |
| 3,706,689 | 12/1972 | Haskins | 252/626 |
| 3,914,373 | 10/1975 | Jepson | 423/2 |
| 4,452,702 | 6/1984 | Blasius et al. | 210/638 |
| 4,460,474 | 7/1984 | Blasius et al. | 210/679 |
| 4,600,566 | 7/1986 | Fujine et al. | 423/179.5 |
| 4,749,518 | 6/1988 | Davie, Jr. et al. | 252/627 |
| 5,110,474 | 5/1992 | Horwitz et al. | 210/635 |

FOREIGN PATENT DOCUMENTS 1024588 2/1986 Japan.

OTHER PUBLICATIONS

1986 Article by Tang, et al., "Solvent Extraction of Lanthanides with a Crown Ether Carboxylic Acid," *Anal. Chem.*, 58, 3233-3235.
1989 Article by Tang, et al., "Enhanced Extraction of Lanthanides with Crown Ether Carboxylic Acids of Increasing Lipophilicity," *Analyst*, 114, 451-453.
1987 Article by Das, "Ion Exchange Separation of $^{90}$Y From $^{90}$Sr Using Ascorbic Acid and Nitrilotriacetic Acid as Eluents," *J. Radioanal. Nucl. Chem.*, 109, 413-418.
1982 Article by Bartsch, et al., "Synthesis and Acidity of Crown Ethers with Pendant Carboxylic Acid Groups," *J. Org. Chem.*, 47, 457-460.
1987 Article by Mok, et al., "Simultaneous Extraction of Trivalent and Pentavalent Antimony and Arsenic Species in Natural Waters for Neutron Activation Analysis," *Anal. Chem.*, 59, 233-236.
1981 Article by Strzelbicki, et al., "Extraction of Alkali Metal Cations from Aqueous Solutions by a Crown Ether Carboxylic Acid," *Anal. Chem.*, 53, 1894-1899.
1982 Article by Charewicz, et al., "Comparison of Highly Lipophilic Crown Ether Carboxylic Acids for Transport of Alkali Metal Cations from Aqueous Solutions into Chloroform," *Anal. Chem.*, 54, 2094-2097.
1986 Article by Pugi, et al., "Effect of Sidearm Length Upon Competitive Alkali Metal Solvent Extraction into Chloroform by Lipophilic Crown Phosphonic Acid Monoalkyl Esters," *Anal. Chem.*, 58, 2723-2726.
1990 Article by Walkowiak, et al., "Effect of Structural Variations Within Lipophilic Debenzocrown Ether Carboxylic Acids on the Selectivity and Efficiency of Competitive Alkali-Metal Cation Solvent Extraction Into Chloroform," *Anal. Chem.*, 62, 2018-2021.
1988 Article by Tang, et al., "Transport of Trivalent Lanthanides in a $H_2O$-$CHCl_3$-$H_2O$ Liquid Membrane System Containing a Crown Ether Carboxylic Acid," *J. Membrane Sci.*, 35, 339-345.
1988 Article by Tang, et al., "Extraction of Uranium With Crown Ether Carboxylic Acids For Neutron Activation Analysis," *J. Radioanal. Nucl. Chem., Letters*, 128, 61-69.

(List continued on next page.)

*Primary Examiner*—Peter A. Nelson
*Assistant Examiner*—Ngoclan T. Mai
*Attorney, Agent, or Firm*—Leydig, Voit & Mayer

[57] ABSTRACT

Methods and devices for the separation of a radioactive rare earth metal isotopes or a radioactive isotope of yttrium or scandium from their alkaline earth metal precursors with ionizable dibenzo ether derivatives.

69 Claims, 5 Drawing Sheets

OTHER PUBLICATIONS

1963 Article by Prelog, "Iron–Containing Antibiotics and Microbic Growth Factors," *Pure Appl. Chem.*, 6, 327–338.

1971 Article by Maehr, "Antibiotics and Other Naturally Occurring Hydroxamic Acids and Hydroxamates," *Pure Appl. Chem.*, 28, 603–636.

1982 Article by Maurer, et al., "Microbial Iron Chelators: Total Synthesis of Aerobactin and Its Constituent Amino Acid, $N^6$-Acetyl-$N^6$-Hydroxylysine," *J. Am. Chem. Soc.*, 104, 3096–3101.

Unpublished Data Wai, et al., "Separation of $^{90}$Y From $^{90}$Sr By Solvent Extraction With Ionizable Crown Ethers".

1981 Article by Bartsch, et al., "Oxidative Conversions of Sulfene Cycloadducts from Azaheptafulvenes and from Tropone to 1,2-Disubstituted Indoles and 2-Arylbenzofurans, Respectively," *J. Org. Chem.*, 46, 3575.

1961 Article by R. H. Jaeger, et al., "A Simple Synthesis of 'Queen Substance,'" *Tetrahedron*, 14, 320–321.

1983 Article by Bartsch, et al., "Synthesis of Highly Lipophilic Crown Ether Carboxylic Acids," *J. Org. Chem.*, 48, 4864–4869.

1989 Article by Tang, et al., "Preconcentration of Lanthanides From Natural Waters With A Lipophilic Crown Ether Carboxylic Acid," *Talanta*, vol. 36, No. 11, pp. 1129–1133.

1985 Article by Vaughan, et al., "The Production and Biological Distribution of Yttrium-90 Labelled Antibodies," *Int. J. Appl. Radiat. Isot.*, 36, 803–806.

1966 Article by Cerrai, et al., "Reversed-Phase Partition Chromatography on Paper Treated With DI-(2-Ethylhexyl) Orthophosphoric Acid: A Systematic Study of 67 Cations in Hydrochloric Acid," *J. Chromatogr.*, 24, 383–401.

1985 Yoshihara, et al., *Periodic Table with Nuclides and Reference Data*, Springer-Verlag: Berlin, pp. 18–19.

Dialog One Search.

METHODS AND DEVICES FOR THE SEPARATION OF RADIOACTIVE RARE EARTH METAL ISOTOPES FROM THEIR ALKALINE EARTH METAL PRECURSORS

RELATED APPLICATIONS

This application is a continuation-in-part of Natale et al. U.S. patent application Ser. No. 07/714,265 filed Jun. 12, 1991.

FIELD OF THE INVENTION

The present invention relates to chelating agents, and, more particularly, to devices and methods for the separation of radioactive rare earth metal isotopes from their alkaline earth metal precursors with dibenzo ether derivatives, including ionizable crown ethers, and especially to methods and devices for the separation of the radioactive isotope of yttrium, yttrium-90 from the radioactive isotope of strontium, strontium-90.

DESCRIPTION OF THE PRIOR ART

The technological importance of chelation has long been recognized. Chelating agents provide a means for manipulating and controlling metal ions by forming with the metal, complexes that typically have properties markedly different from the metal ion or the chelant. Some uses of chelation technology include water softening, ore leaching, chemical analysis and the extraction and recovery of metals from aqueous media.

For example, the liquid-liquid extraction of rare earth metals from water is well known. In one such process, an organic stream immiscible with water is flowed counter-current to the aqueous mixture which contains the rare earth metal. Chelating agents are typically used in the organic phase to complex with the rare earth metal in the aqueous phase to extract the metal from the aqueous phase.

The complexing properties of crown ethers and the metal cation binding properties of various crown ethers as determined by solvent extraction methods is also known. In such systems, the lipophilic nature of the counteranion has been shown to include the extractibility of the metal ion-crown ether pair into an organic solvent. Macrocyclic hosts with attached functional groups are also known chelating agents. With a negatively charged functional group attached to a macrocyclic host, the need to extract an aqueous-phase counter anion is eliminated.

Recently, it has been reported that a crown ether carboxylic acid (sym-dibenzo-16-crown-5-oxyacetic acid) was used effectively to extract lanthanides from aqueous solutions into an organic phase with high efficiency and selectivity. J. Tang and C. M. Wai, *Anal. Chem.* 1986, 58, 3233. It is also known that macrocycles containing hydroxamic moieties are complexing agents for the transportation of ions in living organisms. For example, open chain compounds called siderophores, such as naturally occurring desferriferrioxamine E is known to complex iron (III) ion. *Development of Ion Chelators for Clinical Use*, A. E. Martell, W. F. Anderson, D. G. Badman, Elseries, North Holland, N.Y. 1981, pp. 13-31 and 102-108.

While the crown-ether carboxylates have been shown to be useful in the extraction of lanthanides, they are not entirely satisfactory for all applications. Moreover, derivatives of hydroxamic acid have not been known heretofore to be suitable as complexing agents for f-block elements, yttrium and scandium. There thus remains a need for chelating agents which are capable of extracting from aqueous media f-block elements, that is elements of the lanthanide series and the actinide series of the Periodic Table, and yttrium and scandium more efficiently than the carboxylates and that exhibit satisfactory selectivities between the elements within these series of elements.

Moreover, the use of ionizable crown ethers for the selective separation of rare earth metal radioisotopes from their alkaline-earth metal precursors has not been known. The importance of a chelation agent for such separations is significant. The radioactive isotope of strontium, that is to say, strontium-90, is an important fission product that decays to yttrium-90 by beta-emission with a half-life of 28.9 years. Yttrium-90, also a beta-emitter, in turn decays to stable zirconium-90 with a half-life of 64h. It is difficult to measure the $^{90}Y$ and $^{90}Sr$ radioisotopes because of the continuous energy distribution of beta-radiation. A chemical separation method is often employed to separate the two radioisotopes prior to determination of them by beta-counting. Separation of $^{90}Y$ from $^{90}Sr$ has analytical significance. Separation of $^{90}Y$ from its generator $^{90}Sr$ has medical significance as well. $^{90}Y$ has a number of potential applications in nuclear medicine including for example, use in making labelled antibodies for tumor therapy studies.

Accordingly, it is a principal object of the present invention to provide a process for the separation of radioactive rare earth metal isotopes and of the radioactive isotopes of yttrium and scandium from their alkaline earth metal radioactive isotope precursors. A related object is to provide a method for the separation of radioactive rare earth metal isotopes and radioactive isotopes of yttrium and scandium with ionizable crown ethers by solvent extraction.

A more specific object is to provide a method for the selective separation of yttrium-90 radioisotope from its radioactive precursor, strontium-90.

A further object of the invention is to provide devices suitable for the separation of radioactive rare earth metal isotopes, and radioactive isotopes of yttrium and scandium from their alkaline earth metal precursors. A related, specific object of the invention is to provide devices for the separation of yttrium-90 from its precursor strontium-90.

These and other objects of the invention will become apparent from the following detailed description of the preferred embodiments.

SUMMARY OF THE INVENTION

The present invention provides methods and devices for the separation of radioactive rare earth metal isotopes and of radioactive isotopes of yttrium and scandium from their alkaline earth metal precursors with an ionizable dibenzo ether derivative, including an ionizable crown ether. The present invention further provides methods and devices for the separation of the radioactive isotope of yttrium, yttrium-90, from its precursor, strontium-90 with an ionizable dibenzo ether derivative, including an ionizable crown ether. The dibenzo ether derivatives that are suitable for use in the methods and devices of the present invention are desirably dibenzo ether derivatives of carboxylic acids and hydroxamic acids. The dibenzo ether derivatives may be cyclic, i.e., crown-ether derivatives, or acyclic, and may be mono, di or tri dentate. The carboxylic acid and hydroxamic acid derivatives may be lipophilic to minimize partitioning of the chelating agent into the aqueous phase. The extraction is reversible with respect to pH, so that the extracted ion may be recovered quantitatively.

In accordance with the invention, the dibenzo ether derivatives of carboxylic acid and hydroxamic acid may be used in solvent extractions, carrier free, the derivatives may be used with a suitable carrier medium to effect the desired separation, or the derivative may be included on a substrate.

BRIEF DESCRIPTION OF THE DRAWINGS

FIGS. 1 through 10 illustrate the extraction efficiency of the yttrium-90 ion and strontium-90 ion using, respectively, for:

FIG. 1 sym-dibenzo-16-crown-5-oxyacetic acid;

FIG. 2, 2-(sym-dibenzo-16-crown-5-oxy)octadecanoic acid;

FIG. 3 2-(sym-dibenzo-16-crown-5-oxy)phenylacetic acid;

FIG. 4, 2-(sym-dibenzo-16-crown-5-oxy)octaacetyl hydroxamic acid;

FIG. 5, 2-(sym-dibenzo-16-crown-5-oxy)octadecanoyl hydroxamic acid;

FIG. 6, 2-(sym-dibenzo-16-crown-5-oxy)phenylacetyl hydroxamic acid;

FIG. 7, sym-dibenzo-19-crown-6-oxyacetic acid;

FIG. 8, sym-dibenzo-19-crown-6-oxyacetyl hydroxamic acid; and

FIG. 9, 2,2'-di-oxyhexadecanoic acid phenoxydiethyl ether;

FIG. 10, 2,2'-di-oxyhexadecanoic acid phenoxy 3, 6-dioxaoctane.

DETAILED DESCRIPTION OF THE PREFERRED EMBODIMENTS

Figure 1:
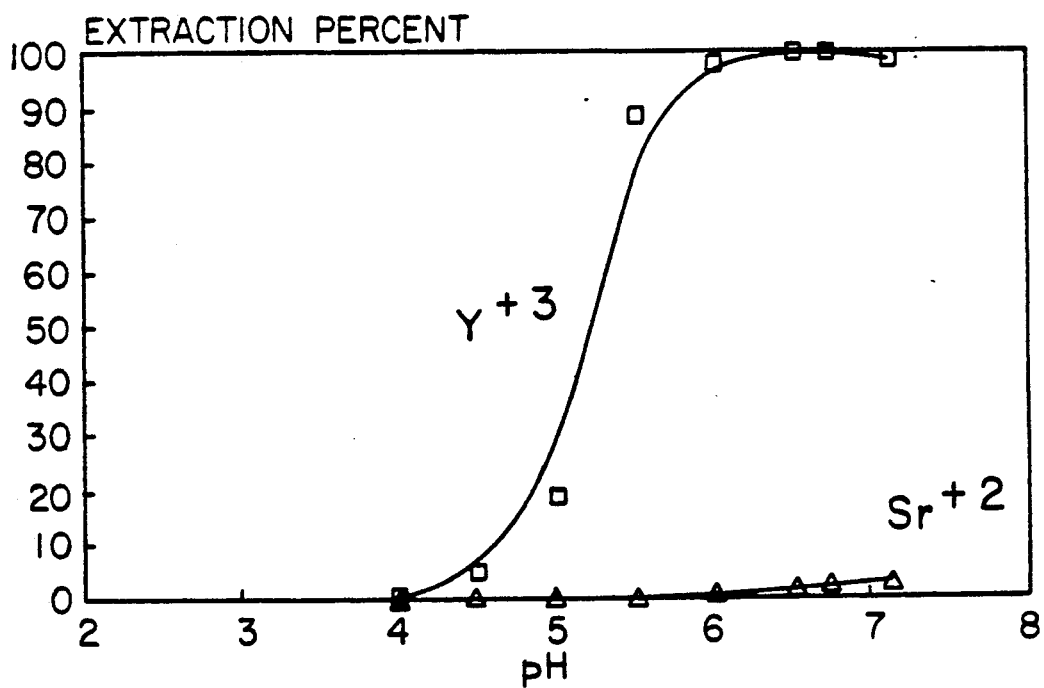

In one aspect of the present invention, there is provided a method for the separation of radioactive rare earth metal isotopes or the radioactive isotopes of yttrium and scandium from their alkaline earth metal precursors by solvent extraction, which comprises contacting a sample which contains the radioactive isotope with a dibenzo ether derivative, including an ionizable crown ether. The method may be carried out by solvent extraction techniques, and free of a support for the dibenzo ether derivative. The dibenzo ether derivative, including the ionizable crown ether is preferably a derivative of a carboxylic acid or a hydroxamic acid. In one aspect, the dibenzo ether derivative is an ionizable crown ether which may be a compound represented by the following empirical formula:

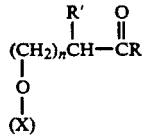

(I)

wherein n is an integer of from 0 to 6, preferably from 0 to 2, X is a dibenzo crown ether of the formula dibenzo[13+3 m]-crown-[4+m]-ether wherein m is an integer of from 0 to about 5 or so, preferably from 0 to 2, R is hydroxyl or —NHOH, and R' is a lipophilic group which imparts lipophilicity to the dibenzo ether derivative. The size of the dibenzo crown ether may be varied provided the metal to be extracted fits in the ring such that the donor atoms coordinate to the metal (or to water associated with the metal). However, crown ethers in which the ring size of the crown is too large for a satisfactory host/guest interaction are not suitable. The preferred dibenzo crown ethers are those in which m is 0, 1 or 2, and are, respectively, dibenzo-13-crown-4 ether, dibenzo-16-crown-5 ether and dibenzo-19-crown-6 ether.

Since the chelating agents to be used in the process of the present invention may be used for the extraction of metal ions of the lanthanide and actinide series and of yttrium and scandium from aqueous medium, the dibenzo ether derivatives are preferably lipophilic in order to minimize or even prevent the chelating agent from partitioning in the aqueous phase. Generally, the greater the lipophilicity of the chelating agent the better the chelating agent will perform. Although R' may be hydrogen, it is preferably a lipophilic moiety. Thus, R' is a hydrocarbyl group having from 1 to about 18 carbon atoms and is selected from the group consisting of alkyl, cycloalkyl, alkenyl and aryl groups. These groups may also be substituted with other functional groups. For example, if aryl is phenyl, the phenyl may be substituted with electron withdrawing groups such as fluorine, or it may be substituted with electron donating groups such as methoxy. By way of illustration and not in limitation, the phenyl group may be completely substituted with fluorine, such that R' is $C_6F_5$ or it may be a 3,5-ditrifluoromethyl phenyl group. Fluorinated derivatives of hydroxamic acid may find special utility in the extraction of lanthanide and actinide metal ions from supercritical fluids.

It has been found that R' groups of from about 6 to about 10 carbon atoms are typically sufficiently lipophilic to minimize partitioning. It has also been found that, in general, higher extraction efficiency is achieved with R' groups of greater lipophilicity, that is, where R' is a longer chain hydrocarbon, and that hydroxamic acids in which the R' group is aryl are often more selective.

In another aspect, the method and devices of the present invention may use an ionizable dibenzo ether derivative of a carboxylic acid or a hydroxamic acid which may be a compound represented by the following empirical formula:

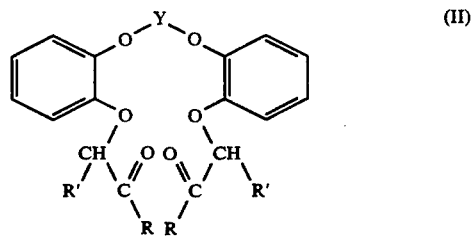

(II)

wherein Y is a member selected from the group consisting of $(CH_2)_3$, $[\{CH_2CH_2O\}_n CH_2CH_2]$ wherein n is an integer of from 1 to about 4, and $CH_2CONHCH_2CH_2NHCOCH_2$; R is hydroxyl or —NHOH; and R', which may be the same or different, is selected from the group consisting of H, and a hydrocarbyl group having from 1 to about 18 carbon atoms and is selected from the group consisting of alkyl, cycloalkyl, alkenyl and aryl groups. As with the ionizable dibenzo ether derivatives represented by formula (I), the R' groups may be lipophilic so as to minimize partitioning of the chelating agent in aqueous medium. Further, as with the ionizable dibenzo ether derivatives represented by formula (I) above these groups may be substituted with other functional groups.

In yet another aspect, the ionizable dibenzo ether derivatives may be a bis-dibenzo crown ether derivative of a hydroxamic acid represented by the following empirical formula:

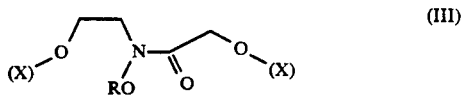
(III)

wherein X is a dibenzo crown ether of the formula dibenzo[13+3 m]-crown-[4+m]-ether and m is an integer of from 0 to about 5 or so, preferably from 0 to 2, and R is hydrogen or a lipophilic hydrocarbyl group having from 1 to about 18 carbon atoms and is selected from the group consisting of alkyl, cycloalkyl, alkenyl and aryl groups. The R groups may be substituted with other functional groups. The dibenzo crown ether X may be the same or different and its size may be varied provided the metal to be extracted fits into the ring to permit chelation. The preferred dibenzo crown ethers are those in which m is 0, 1 or 2, and are, respectively, dibenzo-13-crown-4 ether, dibenzo- 16-crown-5 ether and dibenzo-19-crown-6 ether.

A tridentate derivative of a carboxylic acid or of a hydroxamic acid represented by formula IV, may be used in the practice of the present invention:

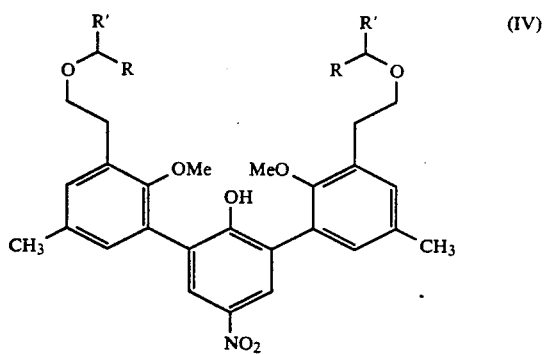
(IV)

In the compound represented by this formula, R may be hydroxyl or —NHOH; R' may be H, but preferably R' is a lipophilic moiety having of from 1 to about 18 carbon atoms and is selected from the group consisting of alkyl, cycloalkyl, alkenyl and aryl groups. The R' groups may be substituted with other functional groups.

The dibenzo crown ether derivatives of hydroxamic acid represented by formula (I) may be prepared, for example, by a two step synthesis. In the first step, a crown ether carboxylic acid derivative is prepared, as for example, by the method disclosed in R. A. Bartsch et al., J. Org. Chem. 1981, 46, 3574. According to this synthesis route, crown ether carboxylic acids are prepared from the corresponding sym-dibenzohydroxy crown ethers by reaction with 2-bromocarboxylic acid in tetrahydrofuran (THF) at room temperature and in the presence of NaH as a base. These carboxylic acid derivatives may be used in the practice of the methods and devices of the present invention. In the second step, crown ether hydroxamic acids are prepared in good yield in a series of three reactions from the corresponding carboxylic acid crown ethers. Crown ether carboxylic acids are converted first to their corresponding acid chlorides by reaction with oxalylchloride in dry benzene at 0° C., stirred at room temperature and finally at 60°-70° C. Since acid chlorides are very reactive compounds and react very easily with water from mixtures, the crown acid chlorides are used without isolation. The reaction may be monitored in TLC.

The crown acid chlorides are then converted to crown O-benzyl hydroxamates by the reaction of the chlorides with O-benzylhydroxylamine hydrochloride in dr acetonitrile in the presence of pyridine as a base. The reactants are added at 0° C. and then the reaction mixture is stirred at room temperature for 24 hours.

The crown hydroxamic acid, which corresponds to the crown acid chloride precursor is prepared by hydrogenation of the crown O-benzyl hydroxamate in methyl hydroxide in the presence of a catalyst, preferably palladium on activated carbon. Hydrogenation time will depend, in part, on the chain length of the R' group. For example, hydrogenation may be accomplished in as short as 3 hours for crown O-benzyl hydroxamates in which the chain length of the alkyl, cycloalkyl or aryl or phenyl groups is relatively short, i.e., on the order of one to about 6 carbon atoms. Hydrogenation is typically much longer for crown O-benzyl hydroxamates which contain long chain alkyl, cycloalkyl, aryl or phenyl groups. If the time of hydrogenation is prolonged, overreduction takes place and an amide is obtained instead of hydroxamic acid. Over-reduction typically occurs in many of the syntheses, but in a very small amount without severe adverse affect. The crown ether hydroxamic acids may be used in the methods and devices of the present invention.

Acyclic dibenzo crown ether derivatives of a carboxylic acid and a hydroxamic acid represented by formula (II), may be prepared by first forming an acyclic polyether dicarboxylic acid by the reaction of a bisphenol and a 2-bromocarboxylic acid in tetrahydrofuran (THF) in the presence of NaH at room temperature. The carboxylic acid may then be used in the processes and devices of the present invention. An intermediate acid chloride is then formed by the reaction of the acyclic polyether dicarboxylic acid with oxalylchloride. The intermediate chloride is reacted with pyridine, to form the desired hydroxamic acid derivative. The hydroxamic acid derivatives may be used in the processes and devices of the present invention.

Bis-dibenzo ether derivatives of hydroxamic acid, represented by formula (III), may be prepared according to the following procedure. Crown ether carboxylic acid is reacted in the presence of LiAlH₄, TsCl with O-benzylhydroxylamine to form the crown O-benzyl hydroxamate. The crown O-benzyl hydroxamate is then reacted with crown-carboxylic acid chloride to give the bis-dibenzo hydroxamic acid derivative product.

The carboxylic acid or hydroxamic acid dibenzo ether derivative represented by formula (IV) may be prepared according to the following procedure. The compound represented by the formula (V) as follows:

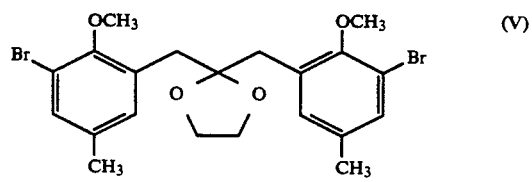
(V)

is reacted with t-butyl lithium so as to undergo halogen metal exchange. The reaction product is treated with dimethylformamide (DMF). The resulting dialdehyde intermediate is reacted with triphenylmethylene phosphorane, by the Wittig reaction. The diolefin product of the Wittig reaction then undergoes hydroboration oxidation with borane dimethylsulfide. The hydroxamic acid is then prepared according to the procedure set forth above for the compounds represented by formula (I). In the final step, the acetal is deprotected and the compound is reacted with nitromalondialdehyde to form the nitrophenol ring. Both the carboxylic acid dibenzo ether derivatives and the hydroxamic acid dibenzo ether derivatives may be used in the processes and devices of the present invention.

It has been found that the extraction efficiency of the ionizable dibenzo ether derivatives, including the ionizable crown ethers may be dependent on the pH at which the extraction is carried out. Accordingly, some experimentation of the extraction conditions, particularly of pH, may be necessary in order to optimize the extraction efficiency for a given radioisotope and for a given dibenzo ether derivative chelant. It is preferable to conduct the extraction at a pH where the percent of the radioactive rare earth metal isotope or radioactive isotope of yttrium or scandium that is extracted is maximized and the alkaline earth metal precursor is not extracted at all or the extraction of the alkaline earth metal precursor is minimized. By way of illustration, to separate $^{90}Y$ from $^{90}Sr$, the extraction may be carried out at a pH in the range of from about pH 2.5 to about pH 7, depending on the dibenzo ether derivative employed. As discussed previously, the ionizable dibenzo ether derivatives may be used in solvent extraction processes, or they may be included on or in a suitable substrate. Thus, for example, various papers, such as chromatographic paper, impregnated with the ionizable dibenzo ether derivatives may be used. Membranes modified with the ionizable dibenzo ether derivatives may also be used. Modified gels may also be used. The concentration of dibenzo ether derivatives employed is not narrowly critical; however it is desirable to minimize the concentration used for economy. By way of example, a concentration of dibenzo ether derivatives of from about $5 \times 10^{-2}M$ to about $5 \times 10^{-3}M$ in a chloroform-heptanol mixture has been found suitable for impregnating chromatographic papers.

The following Examples are intended to further illustrate the invention which is described herein, and are not intended to limit the scope of the invention.

EXAMPLES 1-4

These Examples illustrate the preparation of crown ether carboxylic acids which may be used in the practice of the present invention. In addition, the crown ether carboxylic acids may be used as the precursors for the preparation of the corresponding hydroxamic acid derivatives which may in turn, be used in the practice of the present invention. The following procedure was used to prepare the crown ether carboxylic acids.

Dry THF (50 mL) was added to 1.2 g (50 mmol) of dry NaH under nitrogen. After the mixture was stirred for 30 minutes at room temperature, 3.46 g (10 mmol) of crown alcohol dissolved in 80 mL of THF was added for 1 hour. The reaction mixture was stirred for another hour after which 15 mmol of 2-bromocarboxylic acid dissolved in 80 mL of THF was added dropwise over a period of 10-12 hours. The stirring was continued another 12 hours at room temperature. Reaction flow was monitored on TLC and the starting material still was present. An additional 5 mmol of 2-bromocarboxylic acid dissolved in 20 mL of THF was added during 1 hour, and the reaction mixture was stirred for 5-6 hours at room temperature. Water was carefully added to destroy the unconsumed NaH, and then THF was evaporated. The residue was added to 80-100 mL of water, acidified with 6 M HCl and extracted with $CH_2Cl_2$. Organic layers were combined, washed with water and dried over $MgSO_4$ and evaporated in vacuo. The residue was a yellow-brown oil to which hexane was added. The mixture was placed in a refrigerator. The resultant white solid was filtered with suction, washed with hexane, dried and recrystallized from hexane to give pure white solids.

In these Examples, the crown alcohol was sym-dibenzohydroxyl-16-crown-5, prepared by the method of Bartsch et al. *J. Orq. Chem.*, 1981, 46, 3574. In Examples 1 through 4, the 2-bromocarboxylic acids were, respectively, 2-bromododecanoic acid, 2-bromotetradecanoic acid, 2-bromohexadecanoic acid and 2-bromooctadecanoic acid.

In Example 1, 2-(sym-dibenzo-16-crown-5-oxy)-dodecanoic acid (m.p. 69°-70° C.) was obtained in 80% yield.

In Example 2, 2-(sym-dibenzo-16-crown-5-oxy)tetradecanoic acid (m.p. 78°-79.5° C.) was obtained in 66% yield.

In Example 3, 2-(sym-dibenzo-16-crown-5-oxy)hexadecanoic acid (m.p. 78°-80° C.) was obtained in 70% yield.

In Example 4, 2-(sym-dibenzo-16-crown-5-oxy)octadecanoic acid (m.p. 65.5°-67° C.) was obtained in 64% yield.

Hydroxamic acid derivatives corresponding to the carboxylic acid derivatives of Examples 1-4 may be prepared by first converting the carboxylic acid derivative to the acid chloride by reacting it with oxalylchloride, then converting the acid chloride to O-benzylhydroxamate by reacting the acid chloride with O-benzylhydroxylamine hydrochloride and then hydrogenating the O-benzylhydroxamate.

EXAMPLE 5

This Example illustrates the preparation of 2-(sym-dibenzo-16-crown-5-oxy)phenylacetic acid.

To 6 equivalents of dry NaH, 40-50 mL of THF were added under nitrogen. After the mixture was stirred for 30 minutes at room temperature, 15 mmol (5.19 g) of crown alcohol dissolved in 100 mL of THF was added dropwise for 1 hour and was stirred for another hour. Then 22.5 mmol (4.83 g) of 2-bromophenylacetic acid dissolved in 100 mL of THF was added dropwise over 10-12 hours. The reaction mixture was stirred for 24 hours at room temperature. Water was added to destroy unconsumed NaH, and the THF was evaporated in vacuo. The residue was dissolved in 100 mL of water and then extracted with ether to remove unreacted crown alcohol. The water layer was acidified with 6 M HCl and extracted with $CH_2Cl_2$. The $CH_2Cl_2$ layer was washed with water, dried with $MgSO_4$ and evaporated in vacuo to give a white crystalline solid. Recrystallization from ethylacetate in hexane gave 76% of white solid (m.p. 127°-128.5° C.).

EXAMPLES 6-10

These Examples illustrate the preparation of dibenzo-crown ether O-benzylhydroxamates from their corresponding carboxylic acids.

First, the carboxylic acid was converted to the corresponding acid chloride according to the following procedure.

Crown carboxylic acids (5 mmol) were added to 10 mL of dry benzene under nitrogen. At 0° C., 20 mmol oxalylchloride was added dropwise and then left to stir at room temperature for an additional hour. The reaction mixture then was stirred for 1 hour at 60°-70° C. The solvents were evaporated in vacuo, and the product was used immediately for the next step.

Second, O-benzylhydroxamates were prepared from the acid chlorides according to the following procedure.

O-Benzylhydroxylamine hydrochloride (800 mg; 5 mmol) was suspended in 10 mL of dry acetonitrile and treated with pyridine (10 mmol). The mixture was cooled to 0° C., and the acetonitrile solution containing acid chloride was added dropwise. The mixture was allowed to warm up to room temperature, and stirring was continued for 24 hours. Solvents were evaporated and the residue taken up in ethylacetate. The residue was washed twice with 0.6 M HCl, once with water, once with $NaHCO_3$, and once again with water. After the mixture was dried ($MgSO_4$) and evaporated, the O-benzyl-hydroxamate was obtained.

In Example 6, sym-dibenzo-13-crown-4-oxyacetyl-o-benzylhydroxamate was obtained.

In Example 7, sym-dibenzo-16-crown-5-oxyacetyl-o-yield.

In Example 8, sym-dibenzo-19-crown-6-oxyacetyl-o-benzylhydroxamate was obtained in 84% yield as an oil.

In Example 9, sym-dibenzo-16-crown-5-oxy)octadecanoyl-o-benzylhydroxamate (m.p. 75°-77° C.) was obtained in 76% yield after recrystallization from acetonitrile.

In Example 10, 2-(sym-dibenzo-16-crown-5-oxy)-phenylacetyl-o-benzylhydroxamate (m.p. 128°-130° C.) was obtained in 74% yield after recrystallization from $CH_2Cl_2$ in hexane.

EXAMPLES 11-15

These Examples illustrate the preparation of dibenzo-crown ether derivatives of hydroxamic acid from their corresponding dibenzo crown ether o-benzylhydroxamates, according to the following procedure.

O-Benzylhydroxamate (0.75 g; 2.92 mmol) in 30 mL of methanol was stirred under $H_2$ at room temperature and atmospheric pressure in the presence of 200 mg 10% Pd/C (contains 50% water) for 3-4 hours. Catalyst was filtered and methanol was evaporated. All hydroxamic acids gave positive $FeCl_3$ tests.

In Example 11, sym-dibenzo-13-crown-4-oxyacetyl-hydroxamic acid (m.p. 136°-137° C.) was obtained.

In Example 12, sym-dibenzo-16-crown-5-oxyacetyl-hydroxamic acid (m.p. 108°-110° C.) was obtained in 72% yield after recrystallization from methanol.

In Example 13, 2-(sym-dibenzo-16-crown-5-oxy)octadecanoyl hydroxamic acid (m.p. 51°-53° C.) was obtained in 74% yield after recrystallization from methanol.

In Example 14, 2-(sym-dibenzo-16-crown-5-oxy)-phenylacetylhydroxamic acid (m.p. 138°-140° C.) Was obtained in 77% yield after recrystallization from ethylacetate and hexane.

In Example 15, sym-dibenzo-19-crown-6-oxyacetylhydroxamic acid (m.p. 134°-135° C.) was obtained in 88% yield after recrystallization from methanol.

EXAMPLES 16-20

These Examples illustrate the preparation of acyclic dibenzo ether derivatives of carboxylic acid. The carboxylic acid derivatives are precursors for the preparation of the corresponding derivatives of hydroxamic acid. The carboxylic acid and hydroxamic acid derivatives are illustrated by formula (II). Either the carboxylic acid derivatives or the hydroxamic acid derivatives may be used in the processes and devices of the present invention. The following procedure was used to prepare the carboxylic acid derivatives.

To 1.2 g (50 mmol) of NaH, 30 mL of THF was added under nitrogen. The mixture was stirred for 30 minutes at room temperature and then 5 mmol of appropriate bisphenol dissolved in 50 mL of THF was added dropwise for 1 hour and was stirred for another hour at room temperature. After stirring, 10 mmol of the 2-bromocarboxylic acid dissolved in 50 mL of THF was slowly added over 10-12 hours. The reaction mixture was stirred for 24 hours at room temperature. Water was carefully added to destroy the excess of NaH and THF was evaporated in vacuo. The residue was dissolved in water and acidified with 6 M HCl, extracted with $CH_2Cl_2$. The $CH_2Cl_2$ layer was washed, dried over $MgSO_4$ and evaporated in vacuo to give oil products which were crystallized from organic solvent. The products of Examples 16, 17 and 18 were cooled in a refrigerator.

In Example 16, 2,2'-di-oxyhexadecanoic acid phenoxy propane (m.p. 92°-94° C.) was obtained in 52% yield after recrystallization from ethanol.

In Example 17, 2,2'-di-oxyhexadecanoic acid phenoxydiethyl ether (m.p. 77°-79° C.) was prepared in 83% yield after recrystallization from n-hexane.

In Example 18, 2,2'-di-oxyhexadecanoic acid phenoxy 3,6-dioxaoctane (m.p. 67°-69° C.) was obtained in 83% yield after recrystallization from n-pentane n-hexane.

In Example 19, 2,2'-di-oxyphenylacetic acid phenoxydiethylether (m.p. 41°-43° C.) was obtained in 70% yield as an oil which crystallized after drying after separation in silica gel in vacuum with $CH_2Cl_2$:MeOH (9:1) as eluent.

In Example 20, 2,2'-di-oxyhexadecanoic acid N,N'-ethylene acetamide (m.p. 114°-116° C.) was obtained in 62% yield after recrystallization from n-pentane.

EXAMPLE 21

This Example illustrates the preparation of 2,2'-di-oxyhexadecanoyl hydroxamic acid phenoxydiethyl ether from its corresponding carboxylic acid.

Exactly 1.5 mmol (1.197 g) of 2,2'-di-oxyhexadecanoic acid phenoxydiethyl ether were added to 10 mL of dry benzene under nitrogen. At 0° C., 12 mmol oxalylchloride were added dropwise and then stirred at room temperature for an additional hour. The reaction mixture then was stirred for 1 hour at 60°-70° C. The solvents were evaporated in vacuo and the acid chloride product was used immediately for the next step.

Exactly 3 mmol (0.478 g) o-benzylhydroxylamine hydrochloride was suspended in 10 mL of dry acetonitrile and treated with pyridine (6 mmol). The mixture was cooled to 0° C. and the acetonitrile solution containing acid chloride was added dropwise. The mixture was allowed to warm up to room temperature and stirred for 24 hours. Solvents were evaporated and the residue taken up in ethylacetate. The ethyl acetate solution was washed twice with 0.6 M HCl, once with water, once with NaHCO₃, and once water. The mixture was dried (MgSO₄) and evaporated to give a white solid, which was recrystallized from ethylacetate to give 60% yield of white solid, m.p. 95°-97° C.

Exactly 0.45 mmol (450 mg) of 2,2'-di-oxyhexadecanoic hydroxamate phenoxydiethyl ether was suspended in methanol and 100 mg of talc as a catalyst. After 30 minutes, the reaction was complete. About 300 mg (80%) of 2,2'-di-oxyhexadecanoyl hydroxamic acid phenoxydiethyl ether was obtained as a white solid (m.p. 110°-112° C.) after recrystallization from methanol.

EXAMPLES 22-31

The carboxylic acid and hydroxamic acid dibenzo ether derivatives were evaluated for their utility as chelating agents for the selective extraction of radioactive rare earth metal isotopes and of radioactive isotopes of yttrium and scandium from their alkaline earth metal precursors using yttrium-90 and its precursor, strontium-90.

Extraction solutions were prepared by dissolving a weighed amount of the ionizable dibenzo ether derivative in several hundred milliliters of a chloroform-heptanol mixture in a beaker with magnetic stirring to form a solution having a concentration of $3 \times 10^{-3}$M dibenzo ether derivative. After the ionizable dibenzo ether derivative was completely dissolved, the organic phase was shaken with a pH 2 HNO₃ solution to remove potential impurities. Aqueous solutions containing the radioisotopes in trace amounts were mixed with equal volumes of the extraction solutions for the experiments. The pH of the aqueous phase was adjusted with an acetate buffer using an Orion 91 semi-electrode. The mixtures were shaken vigorously on a mechanical wrist-action shaker (Burrell Model 75) for several minutes at room temperature. After shaking, the mixtures were allowed to stand for a period of time for phase separation. A fixed amount of the organic phase and the aqueous phase were then removed from and placed in vials with fast-turn caps for γ counting.

The relative extraction efficiencies of $Sr^{2+}$ and $Y^{3+}$ were determined by competition experiments using $^{87m}Sr$ ($t_{\frac{1}{2}}=2.80h$) and $^{88}Y$ ($t_{\frac{1}{2}}=106.6$ days) as tracers. The gamma energies emitted from these two radioisotopes (388.4 KeV for $^{87m}Sr$ and 898.0 KeV for $^{88}Y$) are sufficiently different so that they can be measured simultaneously by gamma spectrometry. An Ortec Ge(Li) detector was used to measure gamma radiation from the gamma emitters used in the experiments. The detector had a resolution of about 2.3 KeV at 1336 KeV radiation from $^{60}Co$ and an efficiency of 15% relative to a 3×3 NaI crystal. The extraction efficiency curves for the γ emitting radioactive isotopes of yttrium and strontium are illustrated in FIGS. 1-10. In the case of the separation of $^{90}Y$ from $^{90}Sr$, the activities of the beta emitters, $^{90}Sr$ and $^{90}Y$, were measured with a conventional Geiger-Mueller counter.

Examples 22-24 illustrate the extraction efficiency of crown ether carboxylic acids for separating yttrium-90 from its precursor, strontium-90.

In Example 22, the crown ether carboxylic acid is sym-dibenzo-16-crown-5-oxyacetic acid and is referred to as compound 22 (FIG. 1).

Figure 2:
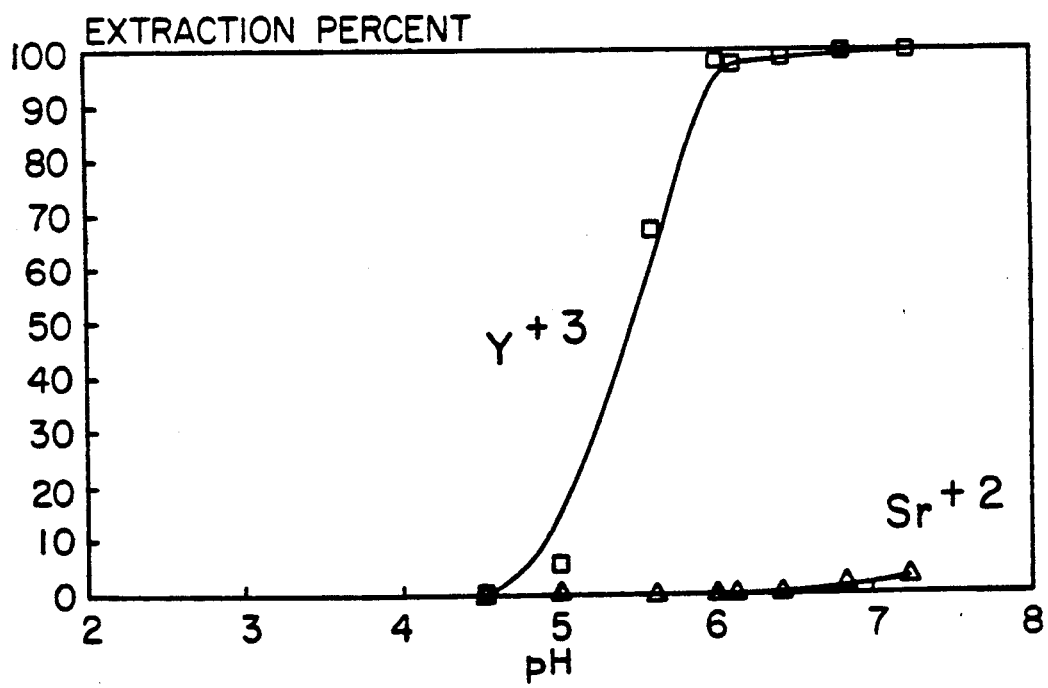

In Example 23, the crown ether carboxylic acid is 2-(sym-dibenzo-16-crown-5-oxy)octadecanoic acid and is referred to as compound 23 (FIG. 2).

Figure 3:
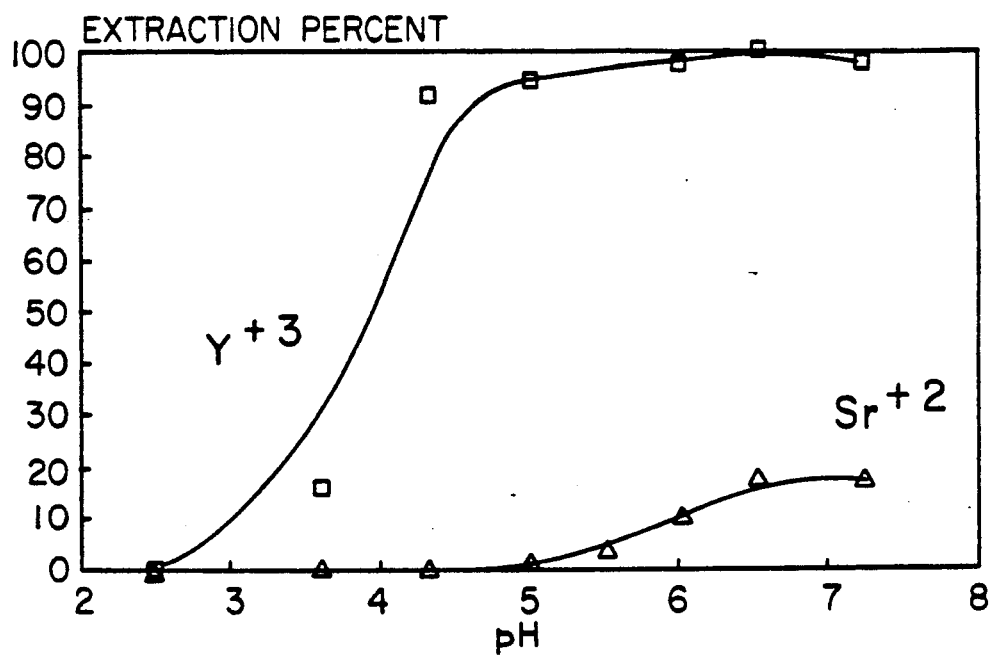

In Example 24, the crown ether carboxylic acid is 2-(sym-dibenzo-16-crown-5-oxy)phenylacetic acid and is referred to as compound 24 (FIG. 3).

It can be seen from FIGS. 1-3 that the ionizable crown ether carboxylic acids provide satisfactory extraction efficiency of yttrium-90 from strontium-90. It can also be seen that the extraction of $Y^{3+}$ by these compounds is strongly pH dependent. The extraction of $Y^{3+}$ by compound 22 into the organic phase becomes appreciable at a pH of greater than 4 (See FIG. 1) and rises rapidly with further increase in pH, reaching a maximum at approximately 6.5 pH units. Above pH 6.5, the extraction of $Sr^{2+}$ into the organic phase becomes observable and continues to increase with further increase in pH.

Alkyl groups on the carbon atom alpha to the carbonyl carbon atom of the crown ether derivatives alters the extraction efficiency profile of the compounds. For example, the effect of a sixteen carbon alkyl group, compound 23, and of a phenyl subsituent, compound 24, are shown in FIGS. 2 and 3, respectively. Compound 23 exhibits a similar extraction efficiency profile to that of compound 22 except that the extraction efficiency for compound 23 is shifted to higher pH by approximately 0.5 pH units. Compound 24 has an extraction range which is widened by approximately two pH units over that of compounds 22 and 23. In addition, compound 24 shows increased extraction of $Sr^{2+}$ over compounds 22 and 23.

Examples 25-27 illustrate the extraction efficiency of crown ether hydroxamic acids for separating yttrium-90 from strontium-90.

Figure 4:
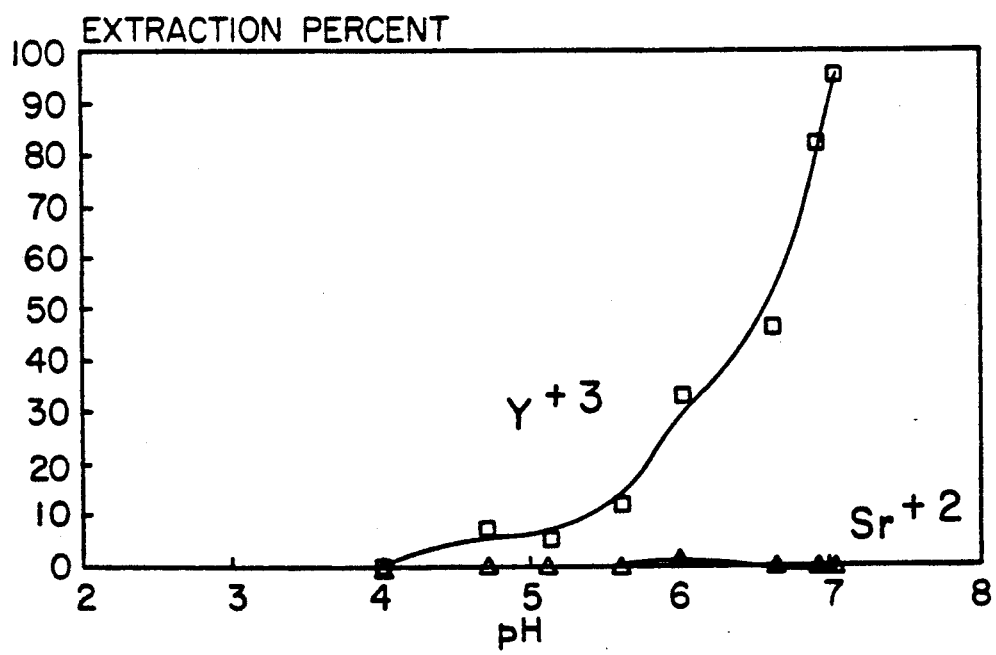

In Example 25, the crown ether hydroxamic acid is 2-(sym-dibenzo-16-crown-5-oxy)oxyoctaacetyl hydroxamic acid and is referred to as compound 25 (FIG. 4).

Figure 5:
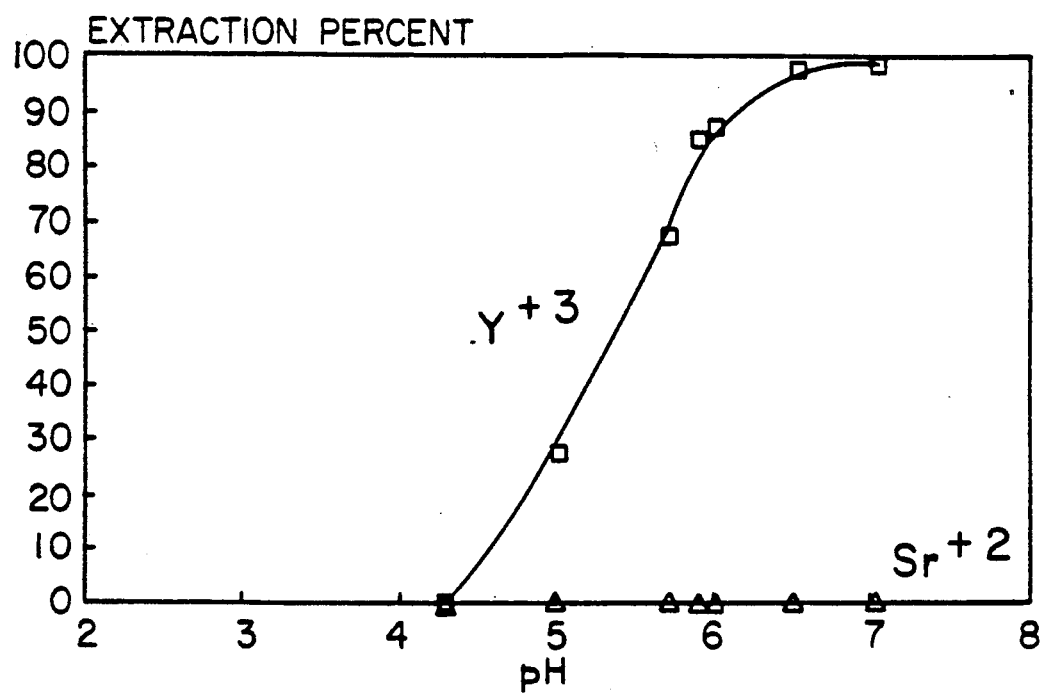

In Example 26, the crown ether hydroxamic acid is 2-(sym-dibenzo-16-crown-5-oxy)octadecanoyl hydroxamic acid and is referred to as compound 26 (FIG. 5).

Figure 6:
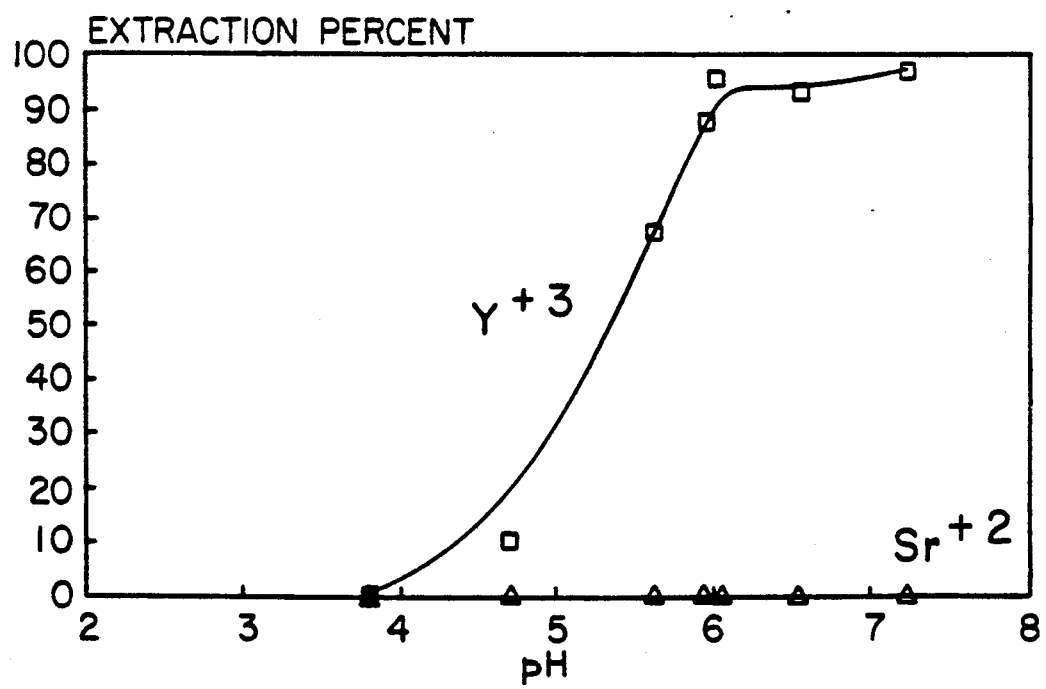

In Example 27, the crown ether hydroxamic acid is 2-(sym-dibenzo-16-crown-5-oxy)phenylacetyl hydroxamic acid and is referred to as compound 27 (FIG. 6).

It can be seen from FIGS. 4-6 that the ionizable crown ether hydroxamic acids provide satisfactory extraction of yttrium-90 from strontium-90.

Moreover, the effect of altering the ionizable functionality by replacement of the carboxylic acid with a hydroxamic acid can be seen from a comparison of FIGS. 1-3 with FIGS. 4-6. Compounds 25-27 contain the same structural characteristics as compounds 22-24, with the only difference being the ionizable functionality.

Compound 25 shows a slower rise in extraction percent of $Y^{3+}$ as a function of pH than its carboxylic acid analogue, compound 22. However, at pH 7.0, the extraction of $Y^{3+}$ remains nearly quantitative. The extraction of $Sr^{2+}$ remains insignificant across the entire pH range. Compound 26 displays an extraction profile very similar to that of compound 23, with the exception that $Sr^{2+}$ is virtually inextractible for all pH values. Compound 27 contains a phenyl group which slightly increases the pH range for extraction. This trend was also observed for compound 24. The extraction efficiency of $Sr^{2+}$ remains negligible for all of the dibenzo ether derivatives containing hydroxamic acid moieties.

Examples 28 and 29 illustrate the effect of increased cavity size of the crown ether on extraction efficiency.

Figure 7:
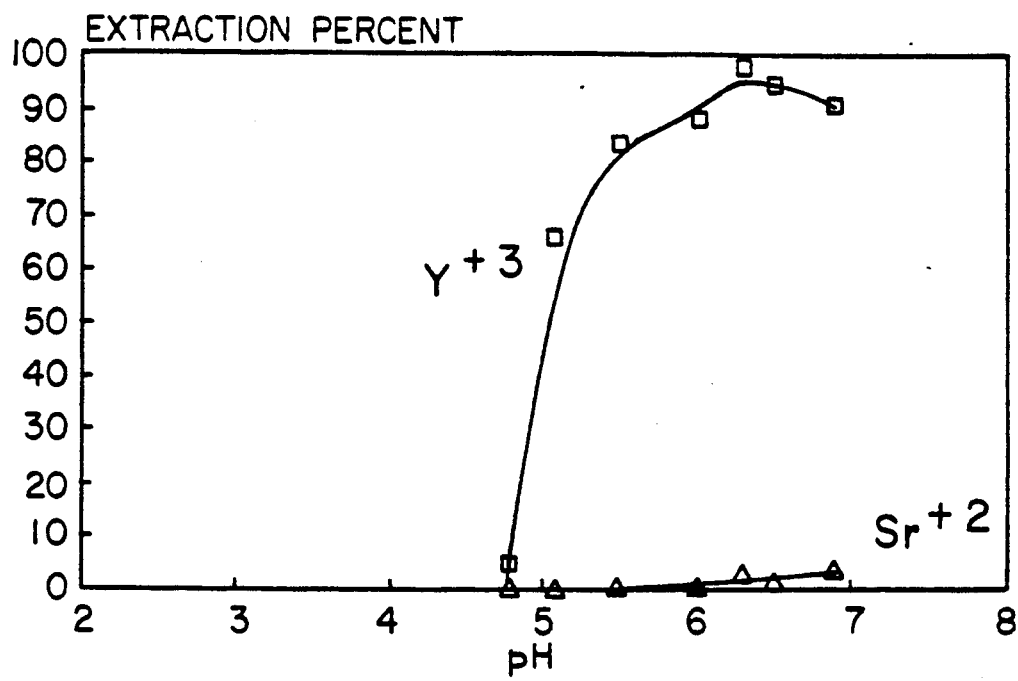

In Example 28, the dibenzo ether derivative is a carboxylic acid sym-dibenzo-19-crown-6-oxyacetic acid and is referred to as compound 28 (FIG. 7).

Figure 8:
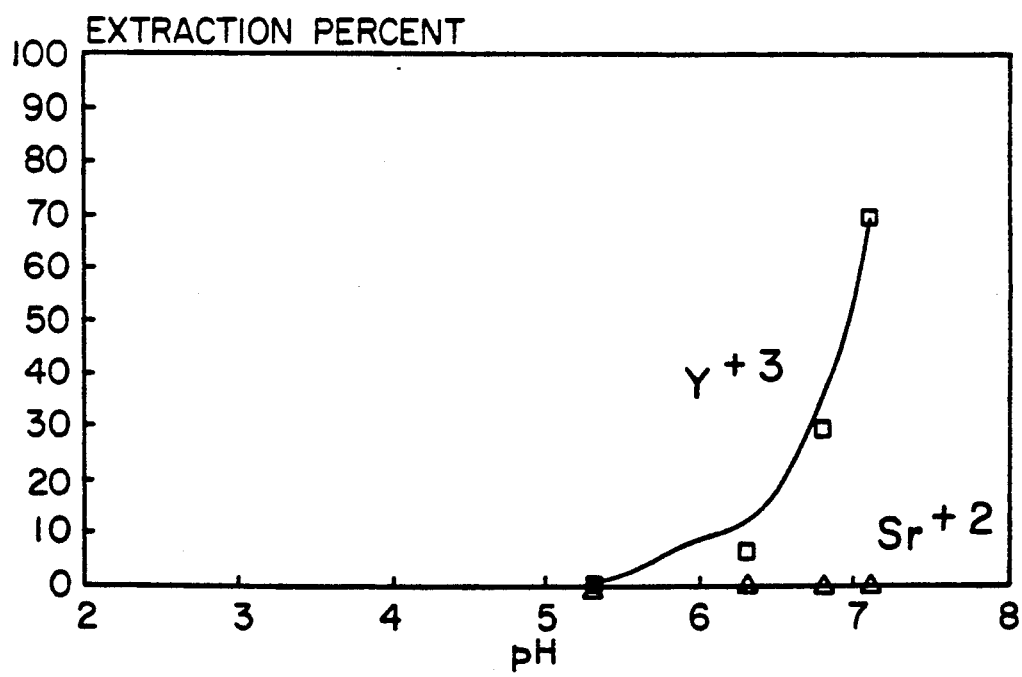

In Example 29, the dibenzo ether derivative is a hydroxamic acid, sym-dibenzo-19-crown-6-oxyacetyl hydroxamic acid and is referred to as compound 29 (FIG. 8).

The molecular structures of compounds 28 and 29 are similar to the molecular structures of compounds 22 and 25 with the exception that the cavities have been increased in size to contain an additional oxygen atom.

The extraction profile (FIGS. 7–8) of $Y^{3+}$ using compound 28 is similar to the extraction profile of $Y^{3+}$ using compound 22, although the extraction efficiency of $Y^{3+}$ is slightly decreased overall. $Sr^{2+}$ is observed to be extracted into the organic phase at pH values above 6.0. The extraction profile of $Y^{3+}$ for compound 29 is very similar to the extraction profile to that of compound 25, although the extraction profile for compound 25 is shifted slightly to a higher pH, and exhibits a lower extraction percent maximum across the range of pH studied.

Examples 30 and 31 illustrate the extraction efficiency of acyclic ionizable dibenzo ether derivatives of a carboxylic acid.

Figure 9:
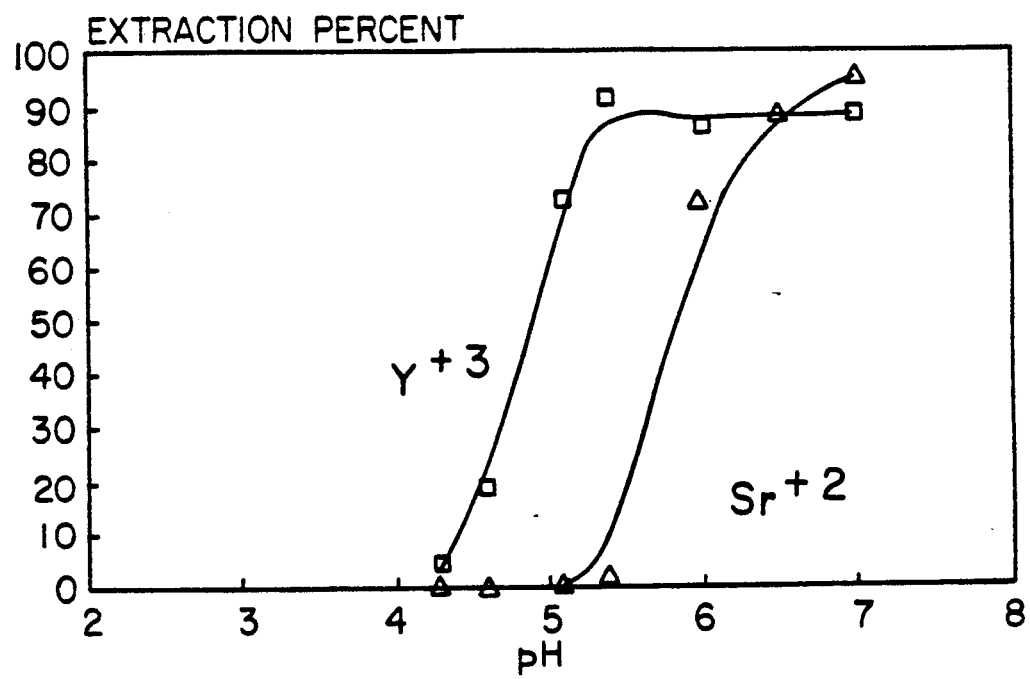

In Example 30, the dibenzo ether derivative is 2,2'-dioxyhexadecanoic acid phenoxydiethyl ether and is referred to as compound 30 (FIG. 9).

Figure 10:
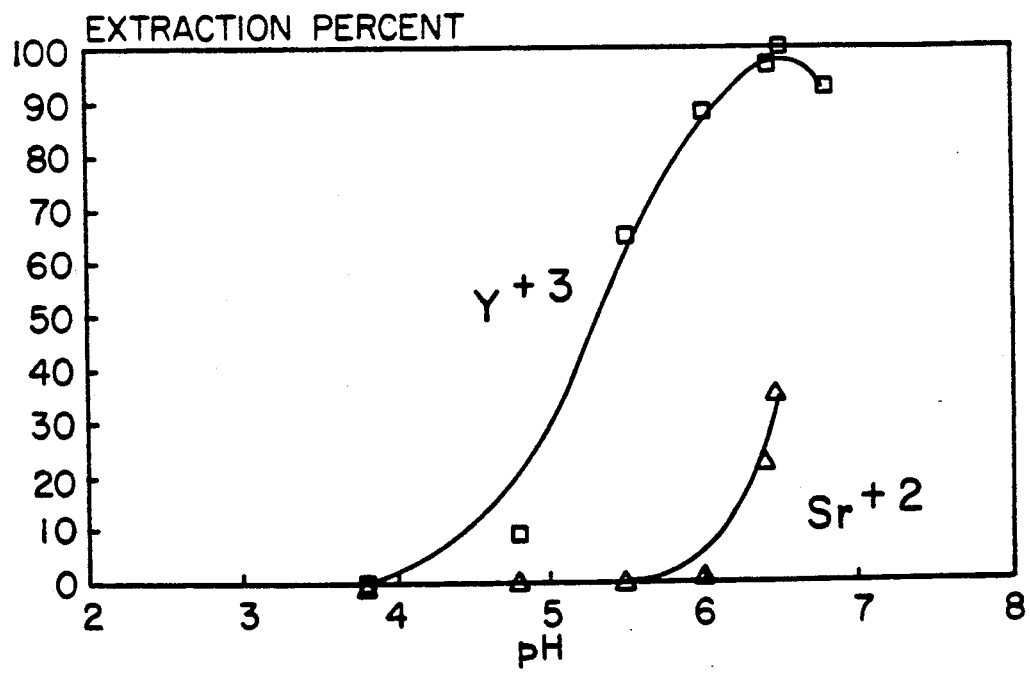

In Example 31, the dibenzo ether derivative is 2,2'-dioxyhexadecanoic acid phenoxy 3,6-dioxaoctane and is referred to as compound 31 (FIG. 10).

These Examples show that the ability of ionizable crown ethers to form complexes with cations is influenced by the flexibility of the macrocyclic ring. Extraction efficiency for extraction experiments performed with compounds 30 and 31 are shown in FIGS. 9 and 10, respectively.

Compound 30 is an open dicarboxylic acid with an alkyl group attached to the methylene carbon atom alpha to the carboxyl carbon atom. As shown in FIG. 9, the extraction of $Y^{3+}$ begins to rise above pH 5 and reaches a maximum at just above 6.5. $Sr^{2+}$ remains inextractible below 6.5 but rises rapidly with further increase in pH and continues to rise as the extraction of $Y^{3+}$ begins to decrease.

Compound 31 is also an open-ring carboxylic acid. Compound 31 differs from compound 30 in that it has a cavity diameter which has been increased by the addition of one oxygen and two methylene groups. The pH dependent extraction profile shown in FIG. 10 shows a similar curve to the extraction profile of compound 30. The extraction profile for compound 31 rises more slowly than the extraction profile of compound 30 and is shifted to a lower pH.

EXAMPLE 32

Extraction of carrier free $^{90}Y$ from $^{90}Sr$ was achieved using sym-dibenzo-16-crown-5-oxyacetic acid. The aqueous phase was prepared by adding an equilibrated $^{90}Sr$ solution to an acetate buffer at pH 6.5. After extraction, the organic phase contains $^{90}Y$ and $^{90}Sr$ which are pure beta emitters, and the radioactive phases were measured with a Geiger-Mueller counter. The activity of the extracted $^{90}Y$ fraction was found to decrease with a half-life of 64.1±0.1 hr, consistent with the value reported in the literature. There was no observable deviation from this half-life value even after 30 days (about 10 half-lives) of counting. The radioisotope purity of the $^{90}Y$ obtained by this separation method is estimated to be greater than 9.9%.

EXAMPLES 33–34

Examples 33 and 34 illustrate a device in accordance with the present invention for the separation of a radioactive rare earth metal isotope from its alkaline earth metal precursor using yttrium-90 and strontium-90.

In these Examples, 1 cm×25 cm chromatographic paper strips (Whatman No. 1) were immersed for 30 seconds in a $1\times10^{-2}M$ solution of crown ether in chloroform.

In Example 33, the crown ether was sym-dibenzo-16-crown-5-oxyacetic acid, referred to as compound 33.

In Example 34, the crown ether was 2-(sym-dibenzo-16-crown-5-oxy) stearic acid, and is referred to as compound 34.

After soaking, the paper strips were removed, allowed to drip, and finally dried in air at room temperature. All chromatograms were run by the descending technique in a closed jar at room temperature (24=1° C.). Sample spots (10 μL in volume each) were applied to a paper strip about 2 cm from one end on a marked line and then allowed to dry in air. The dry strip with sample spots was suspended in a beaker containing the eluent solution, which was made of $5\times10^{-2}M$ sodium acetate at different pH. Each run usually took less than 1 h for the front of the eluent to reach the other end of the strip. Spray reagent (0.1% Alizarin in ethanol) was used to identify Sr and Y spots in the initial tests. In the radioisotope experiments, the strip was cut into sections of different length for β or γ counting.

The $R_f$ values, defined as the distance of the center of the solute spot divided by the distance of the eluent front of $Sr^{2+}$ and $Y^{3+}$, are set forth in Table I:

TABLE I

| | Compound 33 | | Compound 34 | |
| pH | $Sr^{2+}$ | $Y^{3+}$ | $Sr^{2+}$ | $Y^{3+}$ |
| --- | --- | --- | --- | --- |
| 4 | 0.95 | 0.81 | 0.96 | 0.72 |
| 5 | 0.97 | 0.39 | 0.95 | 0.33 |
| 6 | 0.94 | 0.02 | 0.94 | <0.02 |
| 7 | 0.96 | 0.02 | 0.96 | <0.02 |

The data demonstrate that chromatographic paper impregnated with ionizable dibenzo ether derivatives is useful for the separation of $Y^{3+}$ from $Sr^{2+}$.

EXAMPLES 35–38

These Examples illustrate the effect of concentration of the ionizable dibenzo ether derivative for chromatographic paper on the separation of yttrium-90 from strontium-90. The $R_f$ values for strontium and yttrium at pH of 6.5 and various concentrations of compounds 33 and 34 are set forth in Table II.

TABLE II

| concentration | Compound 33 | | Compound 34 | |
| | $Sr^{2+}$ | $Y^{3+}$ | $Sr^{2+}$ | $Y^{3+}$ |
| --- | --- | --- | --- | --- |
| $1\times10^{-3}M$ | 0.96 | 0.51 | 0.95 | 0.37 |
| $5\times10^{-3}M$ | 0.94 | 0.06 | 0.97 | 0.02 |
| $2\times10^{-2}M$ | 0.97 | 0.02 | 0.97 | 0.01 |
| $5\times10^{-2}M$ | 0.95 | <0.02 | 0.96 | 0.01 |

The data demonstrate that papers impregnated with a low concentration of dibenzo ether derivatives provide a simple and efficient way of separating radioactive rare earth isotopes from their alkaline earth metal precursors.

The ionizable dibenzo ether derivatives, including ionizable crown ether derivatives of carboxylic acid and hydroxamic acids are useful chelating agents for the efficient and selective chelation of radioactive rare earth metal isotopes and radioactive isotopes of yttrium and scandium. These compounds are thus useful for the selective separation of the radioactive rare earth metal isotopes and of the radioactive isotopes of yttrium and scandium from their alkaline earth metal precursors. The ionizable dibenzo ether derivatives find utility in analytical applications where it is necessary to determine the presence and concentration of radioactive rare earth metal isotopes or radioactive isotopes of yttrium and scandium, and for the separation and recovery of such radioisotopes from their alkaline earth metal precursors, such as, for the separation and recovery of carrier-free $^{90}$Y and $^{90}$Sr.

The ionizable dibenzo ether derivatives may be used in any of a variety of specific methods and devices for the extraction of radioactive rare earth metal isotopes and radioactive isotopes of yttrium and scandium from their alkaline earth metal precursors. For example, the ionizable dibenzo ether derivatives may be used in typical aqueous-ion liquid-liquid extractions, which, as is known, may be batch, continuous, co-current or countercurrent, and they may also be used in solid-liquid phase extractions and liquid-liquid phase extractions, such as in papers, gels, membranes or the like.

We claim:

1. A method for the separation of a radioactive rare earth metal isotope or a radioactive isotope of yttrium or scandium from its alkaline earth metal precursor comprising contacting a sample containing at least one of said isotopes and said precursor with an ionizable dibenzo ether derivative.

2. The method of claim 1 wherein said dibenzo ether derivative is an ionizable crown ether represented by the formula:

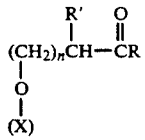

wherein X is a dibenzo crown ether of the formula dibenzo-{13+3m}-crown-{4+m}-ether, and m is an integer of from 0 to about 5, n is an integer of from 0 to 6, R is —OH or —NHOH and R' is H or a lipophilic hydrocarbyl group having from 1 to about 18 carbon atoms and is selected from the group consisting of alkyl, cycloalkyl, alkenyl and aryl groups.

3. The method of claim 2 wherein said dibenzo crown ether is a member selected from the group consisting of (i) dibenzo-13-crown-4 ether, (ii) dibenzo-16-crown-5-ether and (iii) dibenzo-19-crown-6 ether.

4. The method of claim 2 wherein said hydrocarbyl group has from about 6 to about 10 carbon atoms.

5. The method of claim 3 wherein said hydrocarbyl group is an alkyl group having from about 6 to about 10 carbon atoms.

6. The method of claim 2 wherein said hydrocarbyl group is phenyl.

7. The method of claim 3 wherein said hydrocarbyl group is phenyl.

8. The method of claim 7 wherein said phenyl group is substituted with at least one electron withdrawing group or at least one electron donating group.

9. The method of claim 5 wherein R is hydroxyl.

10. The method of claim 5 wherein R is —NHOH.

11. The method of claim 1 wherein said radioactive isotope is yttrium-90 and its precursor is strontium-90.

12. The method of claim 2 wherein said radioactive metal isotope is yttrium-90 and its precursor is strontium-90.

13. The method of claim 9 wherein said radioactive isotope is yttrium-90 and its precursor is strontium-90.

14. The method of claim 10 wherein said radioactive isotope is yttrium-90 and its precursor is strontium-90.

15. The method of claim 13 wherein n is an integer of from 0 to 2.

16. The method of claim 14 wherein n is an integer of from 0 to 2.

17. The method of claim 1 wherein said ionizable dibenzo ether derivative is an acyclic crown ether represented by the formula:

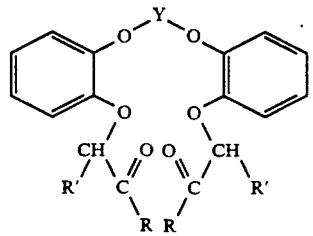

wherein Y is a member selected from the group consisting of $(CH_2)_3$, $[\text{+}CH_2CH_2O\text{+}_n CH_2CH_2]$ wherein n is an integer of from 1 to about 4, and $CH_2CONHCH_2CH_2NHCOCH_2$; R is —OH or —NHOH; and $R^1$, which may be the same or different, is selected from the group consisting of H, and a hydrocarbyl group having from 1 to about 18 carbon atoms and selected from the group consisting of alkyl, cycloalkyl, alkenyl and aryl groups.

18. The method of claim 17 wherein said hydrocarbyl group has from about 6 to about 10 carbon atoms.

19. The method of claim 17 wherein said hydrocarbyl group is phenyl.

20. The method of claim 18 wherein said hydrocarbyl group is phenyl.

21. The method of claim 19 wherein said phenyl group is substituted with at least one electron withdrawing group.

22. The method of claim 21 wherein said electron withdrawing group is fluorine.

23. The method of claim 19 wherein said phenyl group is substituted with at least one electron donating group.

24. The method of claim 20 wherein said phenyl group is substituted with at least one electron withdrawing group.

25. The method of claim 24 wherein said electron withdrawing group is fluorine.

26. The method of claim 25 wherein said phenyl group is substituted with at least one electron donating group.

27. The method of claim 17 wherein Y is [(CH$_2$CH$_2$O)$_n$CH$_2$CH$_2$] and n is 1.

28. The method of claim 17 wherein Y is [(CH$_2$CH$_2$O)$_n$CH$_2$CH$_2$] and n is 2.

29. The method of claim 17 wherein Y is (CH$_2$)$_3$.

30. The method of claim 17 wherein Y is CH$_2$CONHCH$_2$CH$_2$NHCOCH$_2$.

31. The method of claim 27 wherein said hydrocarbyl group is an alkyl group having from about 6 to about 10 carbon atoms.

32. The method of claim 27 wherein said hydrocarbyl group is phenyl.

33. The method of claim 28 wherein said hydrocarbyl group is an alkyl group having from about 6 to about 10 carbon atoms.

34. The method of claim 28 wherein said hydrocarbyl group is phenyl.

35. The method of claim 34 wherein said phenyl group is substituted with at least one electron withdrawing group.

36. The method of claim 35 wherein said electron withdrawing group is fluorine.

37. The method of claim 34 wherein said phenyl group is substituted with at least one electron donating group.

38. The method of claim 17 wherein said rare earth metal radioisotope is yttrium-90 and its precursor is strontium-90.

39. The method of claim 31 wherein said radioactive isotope is yttrium-90 and its precursor is strontium-90.

40. The method of claim 32 wherein said radioactive isotope is yttrium-90 and its precursor is strontium-90.

41. The method of claim 33 wherein said radioactive rare earth metal isotope is yttrium-90 and its precursor is strontium-90.

42. The method of claim 34 wherein said radioactive isotope is yttrium-90 and its precursor is strontium-90.

43. The method of claim 1 wherein said ionizable dibenzo ether derivative is a bis-dibenzo crown ether derivative represented by the formula:

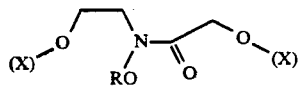

wherein X is a dibenzo crown ether of the formula dibenzo-[13+3m]-crown-[4+m]-ether and m is an integer of from 0 to about 5, and X may be the same or different; R is —OH or —NHOH; and R$^1$ is hydrogen or a lipophilic hydrocarbyl group having from 1 to about 18 carbon atoms and is selected from the group consisting of alkyl, cycloalkyl, alkenyl and aryl groups.

44. The method of claim 43 wherein said dibenzo crown ether is a member selected from the group consisting of dibenzo-13-crown-4 ether, dibenzo-16-crown-5 ether, and dibenzo-19-crown-6 ether.

45. The method of claim 43 wherein said hydrocarbyl group has from about 6 to about 10 carbon atoms.

46. The method of claim 44 wherein said hydrocarbyl group is an alkyl group having from about 6 to about 10 carbon atoms.

47. The method of claim 43 wherein said hydrocarbyl group is phenyl.

48. The method of claim 44 wherein said hydrocarbyl group is phenyl.

49. The method of claim 48 wherein said phenyl group is substituted with at least one electron with drawing group or at least one electron donating group.

50. The method of claim 43 wherein said radioactive isotope is yttrium-90 and its precursor is strontium-90.

51. The method of claim 46 wherein said radioactive rare earth metal isotope is yttrium-90 and its precursor is strontium-90.

52. The method of claim 48 wherein said radioactive isotope is yttrium-90 and its precursor is strontium-90.

53. The method of claim 1 wherein said ionizable dibenzo ether derivative is represented by the formula:

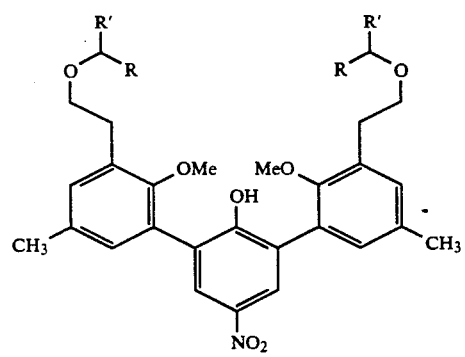

wherein R is —OH or —NHOH; and R$^1$ is H or a hydrocarbyl group having from 1 to about 18 carbon atoms and selected from the group consisting of alkyl, cycloalkyl, alkenyl and aryl groups.

54. A device for the separation of a radioactive rare earth metal isotope or a radioactive isotope of yttrium or scandium from its alkaline earth metal precursor comprising a substrate and a compound represented by the formula:

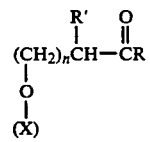

wherein X is a dibenzo crown ether of the formula dibenzo-[13+3m]-crown-[4+m]-ether, and m is an integer of from 0 to about 5, n is an integer of from 0 to 6; R is —OH or —NHOH; and R$^1$ is H or a lipophilic hydrocarbyl group having from 1 to about 18 carbon atoms and is selected from the group consisting of alkyl, cycloalkyl, alkenyl and aryl groups.

55. A device for the separation of a radioactive rare earth metal isotope or a radioactive isotope of yttrium or scandium from its alkaline earth metal precursor comprising a substrate and a compound represented by the formula:

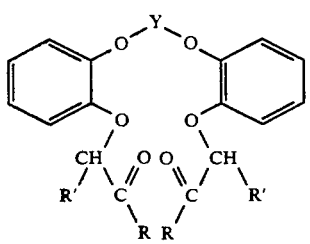

wherein Y is a member selected from the group consisting of (CH₂)₃, [-(-CH₂CH₂O-)ₙCH₂CH₂] where n is an integer of from 1 to about 4, and CH₂CONHCH₂CH₂NHCOCH₂; R is —OH or —NHOH; and R¹, which may be the same or different, is selected from the group consisting of H, and a hydrocarbyl group having from 1 to about 18 carbon atoms and selected from the group consisting of alkyl, cycloalkyl, alkenyl and aryl groups.

56. A device for the separation of a radioactive rare earth metal isotope or a radioactive isotope of yttrium or scandium from its alkaline earth metal precursor comprising a substrate and a compound represented by the formula:

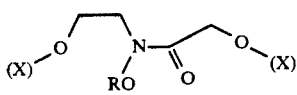

wherein X is a dibenzo crown ether of the formula dibenzo-[13+3m]-crown-[4+m]-ether and m is an integer of from 0 to about 5, and X may be the same or different; R is —OH or —NHOH; and R¹ is hydrogen or a lipophilic hydrocarbyl group having from 1 to about 18 carbon atoms and is selected from the group consisting of alkyl, cycloalkyl, alkenyl and aryl groups.

57. A device for the separation of a radioactive rare earth metal isotope or a radioactive isotope of yttrium or scandium from its alkaline earth metal precursor comprising a substrate and a compound represented by the formula:

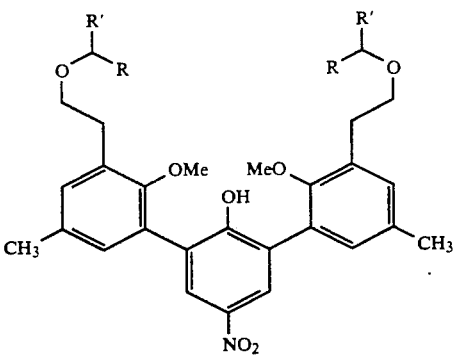

wherein R is —OH or —NHOH; and R¹ is H or a hydrocarbyl group having from 1 to about 18 carbon atoms and selected from the group consisting of alkyl, cycloalkyl, alkenyl and aryl groups.

58. The device of claim 54 wherein the substrate is paper.

59. The device of claim 54 wherein the substrate is chromatographic paper.

60. The device of claim 54 wherein the substrate is a porous medium.

61. The device of claim 55 wherein the substrate is paper.

62. The device of claim 55 wherein the substrate is chromatographic paper.

63. The device of claim 55 wherein the substrate is a porous medium.

64. The device of claim 56 wherein the substrate is paper.

65. The device of claim 56 wherein the substrate is chromatographic paper.

66. The device of claim 56 wherein the substrate is a porous medium.

67. The device of claim 57 wherein the substrate is paper.

68. The device of claim 57 wherein the substrate is chromatographic paper.

69. The device of claim 57 wherein the substrate is a porous medium.

* * * * *

UNITED STATES PATENT AND TRADEMARK OFFICE
CERTIFICATE OF CORRECTION

PATENT NO. : 5,225,173
DATED : July 6, 1993
INVENTOR(S) : CHIEN M. WAI

It is certified that error appears in the above-identified patent and that said Letters Patent is hereby corrected as shown below:

ON THE TITLE PAGE:

[56] References Cited

U.S. PATENT DOCUMENTS 4,749,518 6/1988, delete "Davie" and substitute therefor -- Davis --;

OTHER PUBLICATIONS

Second column, line 14, delete "Pugi" and substitute therefor -- Pugia --; and

Second column, line 19, delete "Debenzocrown" and substitute therefor -- Dibenzocrown --.

IN THE SPECIFICATION:

Column 5, line 56, delete "Oro." and substitute therefor -- Org. --;

Column 6, line 9, delete "dr" and substitute therefor -- dry --;

Column 9, lines 34-35, delete "sym-dibenzo-16-crown-5-oxyacetyl-o-" and substitute therefor -- sym-dibenzo-16-crown-5-oxyacetyl-o-benzylhydroxamate (m.p. 112-114°C) was obtained in 83% --;

UNITED STATES PATENT AND TRADEMARK OFFICE
CERTIFICATE OF CORRECTION

PATENT NO. : 5,225,173

DATED : July 6, 1993

INVENTOR(S) : CHIEN M. WAI

It is certified that error appears in the above-identified patent and that said Letters Patent is hereby corrected as shown below:

IN THE SPECIFICATION (CONT'D.)

Column 9, line 68, delete "Was" and substitute therefor -- was --;

Column 11, line 7, after "and once" insert "again with"; and

Column 14, line 6, delete "9.9%" and substitute therefor

-- 99.9% --.

Signed and Sealed this

Second Day of May, 1995

·BRUCE LEHMAN

*Attest:*

*Attesting Officer*   *Commissioner of Patents and Trademarks*